Figure 1:
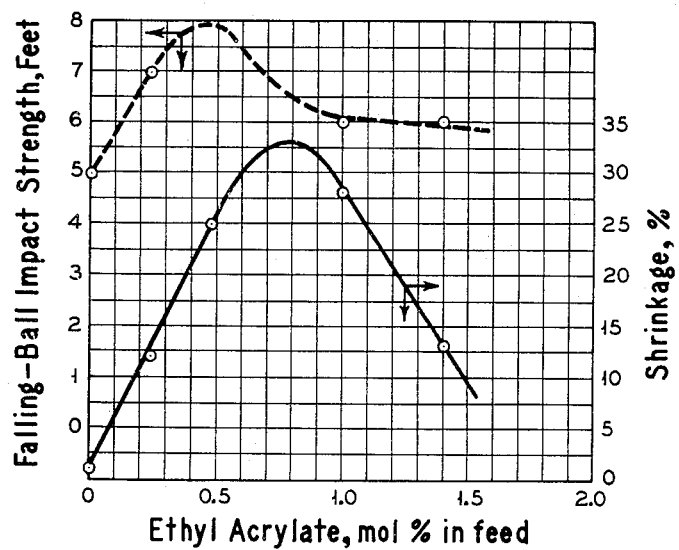
Figure 2:
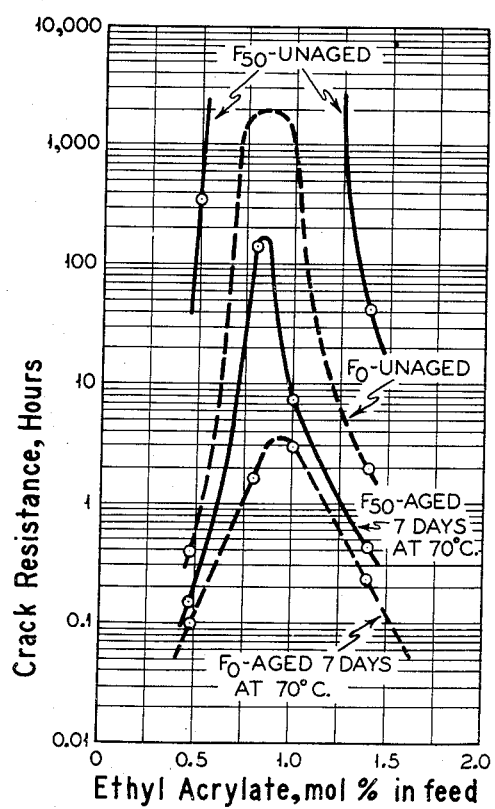
Figure 3:
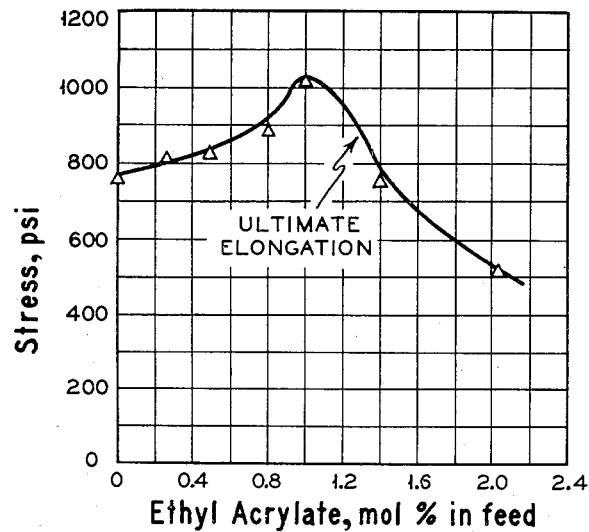
Figure 4:
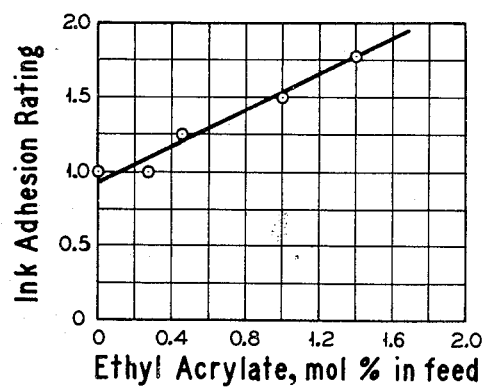
Figure 5:
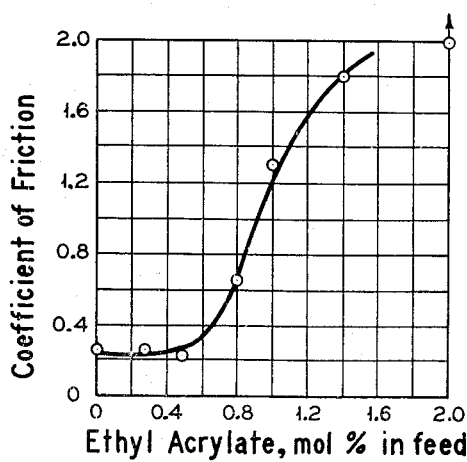

INVENTOR.
WAYNE G. WHITE

INVENTOR.
WAYNE G. WHITE
AGENT

United States Patent Office 2,953,551
Patented Sept. 20, 1960

2,953,551

ETHYLENE-ALKYL ACRYLATE COPOLYMER AND PROCESS OF PRODUCING SAME

Wayne G. White, South Charleston, W. Va., assignor to Union Carbide Corporation, a corporation of New York Filed June 16, 1958, Ser. No. 742,389

5 Claims. (Cl. 260—86.7)

This invention relates to copolymers of ethylene. More particularly it is concerned with copolymers of ethylene with an alkyl ester of acrylic acid.

It is known that acrylate esters can be copolymerized with ethylene to produce a wide variety of polymers. However, the copolymers heretofore obtained have not shown any advantages over polyethylene itself, and in most instances have not been useful because of their tacky or rubbery properties.

It has now been found that ethylene/alkyl acrylate copolymers having improved impact strength, greater shrinkage, vastly improved stress crack resistance and improved tensile strength, ultimate elongation and in adhesion and blocking properties can be obtained by copolymerizing an alkyl acrylate with ethylene. These improvements are obtained only when the alkyl acrylate concentration is maintained within a narrow critical range; and failure to stay within this critical range results in a copolymer which shows no improvements over polyethylene itself, and over the known ethylene/alkyl acrylate copolymers. In addition to the above stated advantages, the copolymers of this invention are superior with respect to resistance to skinning and delaminating, and in dry colorability.

In addition to criticality in the concentration of alkyl acrylate, there is also criticality in the process used to produce the copolymer. It has been found that these advantages are obtained when the copolymer is produced continuously in a tubular reactor wherein the accurately measured reactants are charged into one end of the reactor and the product withdrawn from the opposite end. In this type of continuous reactor there is a continual decline in the concentration of the ethyl acrylate as the reactants proceed through the tubular reactor because of the greater reactivity of the alkyl acrylate. This leads to a non-homogeneous copolymer containing units having the formulae:

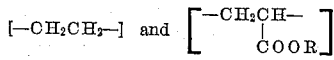

wherein the structure of the copolymer is predominantly a series of long chains of [—CH₂CH₂—] units with each chain of [—CH₂CH₂—] units connected to another chain thereof by a

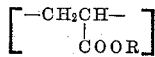

unit or chain containing from 1 to about 5 of said

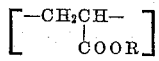

units, and wherein the molar ratio of [—CH₂CH₂—] units to

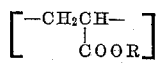

units is from about 65:1 to about 500:1 and preferably from about 100:1 to about 250:1. In the above formula R represents a lower alkyl radical containing from 1 to about 12 carbon atoms and preferably 2 to about 5 carbon atoms; such as methyl, ethyl, propyl, sec.-butyl, n-butyl, hexyl, 2-ethylhexyl, and the like. Together with the copolymer there is also formed some homopolymeric polyethylene which need not be separated. The improved copolymers of this invention have densities from about 0.915 to about 0.94 gram per cc. at 23° C.

The copolymers obtained by the continuous reaction in a tubular reactor are different from those produced by the batch process. In the operation of a batch type reactor, the co-reactants are continuously added to the autoclave and product plus unreacted feed are intermittently withdrawn. Under such conditions of operation the concentrations of the co-reactants in the autoclave soon reach equilibrium, that is, the ratio of alkyl acrylate to ethylene reaches a constant value dependent on the feed rate and rate of reaction, and the copolymers produced have a uniform composition. Such copolymers do not possess the advantageous properties present in the non-homogeneous copolymers produced continuously in a tubular reactor.

In accordance with this invention it has been found that ethylene/alkyl acrylate copolymers having the aforementioned desirable properties can be obtained by copolymerizing ethylene with from about 0.2 to about 1.5 moles, and preferably from about 0.4 to about 1 mole, of an alkyl acrylate per 100 moles of ethylene in the presence of a free radical catalyst at pressures of from about 20,000 p.s.i. to about 40,000 p.s.i. or higher; and at polymerization temperatures of from about 100° C. to about 350° C., preferably from about 160° C. to about 250° C.

The alkyl acrylates employed in this invention are the lower alkyl acrylates containing from 1 to about 12 carbon atoms in the alkyl radical and preferably from 2 to about 6 carbon atoms in the alkyl radical. Illustrative of the acrylates found suitable are ethyl acrylate, propyl acrylate, pentyl acrylate, 2-ethylhexyl acrylate, decyl acrylate, and the like; preferably free of inhibitors which are usually found in alkyl acrylates. As previously indicated, the alkyl acrylate concentration is critical, and should be kept within the limits specified in order to achieve the desired products. Exceeding the amounts indicated leads to rubbery, tacky, elastomeric products which find very little commercial use.

Among the catalysts which can be used in this invention are molecular oxygen, which is preferred, and materials which yield oxygen under the reaction conditions, such as peroxide compounds. Illustrative peroxide compounds are hydrogen peroxide, persuccinic acid, lauroyl peroxide, butyryl peroxide, benzoyl peroxide, acetyl peroxide, peracetic acid di-tert.-butyl peroxide, the alkali metal persulfates, perborates and percarbonates, diisopropyl peroxydicarbonate, and the like. The concentration of the catalyst can be varied from about 0.001 to about 5 mole percent based on the total weight of the polymerizable monomers charged. The preferred catalyst is, however, molecular oxygen at a concentration of from about 20 to about 200 parts per million.

The purity of the ethylene feed is not critical, and commercially available ethylene can be used, which generally varies in purity from about 90 to about 99.5% ethylene. The other gases generally found in small amounts in commercial ethylene are acetylene, propylene, butylene, ethane, propane and other saturated hydrocarbons. In most cases these impurities are present in a total concentration of less than 5%.

In the examples hereinafter shown the polymerizations were carried out in a jacketed tubular reactor. The reaction mixture comprising ethylene, alkyl acrylate and catalyst was compressed to between 25,000 and 35,000 p.s.i. and fed continuously through the tubular reactor, wherein the same pressure range was maintained during the polymerization. The copolymer as formed, at an overall conversion of from about 15 to 25% of the charge, was continuously discharged from the tubular reactor into a hot pot where unreacted ethylene and trace amounts of alkyl acrylate were flashed off, extruded into a water bath to cool and recovered.

The improvements in the resin properties are evident from Figs. I to V of this specification, which clearly bring out the criticality of the alkyl acrylate concentration.

In Fig. I the improved impact strength and greater shrinkage within the range of alkyl acrylate claimed in this invention is clearly evident. It is also evident that at alkyl acrylate concentrations above about 1.5 moles per 100 moles of ethylene that the copolymer shows no significant advantages over polyethylene itself.

Fig. II illustrates the improvements in stress crack resistance. Improvement is seen both on the aged and unaged samples.

Fig. III clearly points out the improvements ultimate elongation obtained in the copolymers of this invention. As can be seen, the copolymers having an ethyl acrylate concentration of about 1 mole percent in the feed have the highest elongation values.

Fig. IV illustrates the improvements in ink adhesion rating as the ethyl acrylate concentration in the feed is increased.

Fig. V shows the effect of ethyl acrylate on the coefficient of friction. In this graph as the valve increases the film is less prone to stick to itself on the roll, and thus does not block.

The following tests were used in characterizing the copolymers of this invention:

Melt index: A.S.T.M. D-1238-52T.
Density: Hunter and Oaks, Trans. Faraday Soc., 41, 49.
Stiffness: A.S.T.M. D-747-48T, using a specimen about 1½" by ½" by 0.04" to 0.08" thick cut from a compression molded plaque annealed 24 hours at 23° C.
Impact strength: The falling ball impact test is employed, which consists of determining the height in feet at which a MacGregor official 100 NB Nightball, released without twisting or forward motion, will rupture a piece of 1.5 mil film. The film is mounted on the open end of a cylinder by means of a spring band so that it is taut and wrinkle-free, but not stretched.
Shrinkage: A measure of the percentage shrinkage occurring when a film is held at 110° C. for 5 minutes.
Stress crack resistance: Die cut compression molded plaques 1½" by ½" by 0.12" are nicked lengthwise and inserted in test tubes filled with Igepal CA, and iso-octyl phenoxy polyoxyethylene ethanol, and kept in a 50° C. bath. The samples are observed periodically for failures. $F_0$ is the time for failures to begin, and $F_{50}$ is the time in hours for 50 percent of the samples to fail.
Ultimate elongation: A "dog-bone" shaped specimen is cut from a compression molded 75 mil plaque, and stretched on an Instron tester. The difference between the length at break minus the original length divided by the original length and multiplied by 100 is the percent ultimate elongation.
Ethyl acrylate content: Infra-red supported by elemental analysis.
Ink adhesion: Ink is applied to a thin film and after thoroughly dry, pressure sensitive cellophane tape (Scotch tape) is pressed on and then removed. Samples are rated from zero (all ink removed) to five (no ink removed by the tape).
Coefficient of friction: A 16" x 18" sample of film is taped smoothly to the surface of a level plane with the machine direction of the film in the direction of sled travel. Care is taken to remove all wrinkles without causing any elongation of the film. A smaller specimen of the film is attached to a sled consisting of a steel block ⅞" x 2⅜" x 4" mounted on a rubber base which has a total weight of one kilogram. The sled is attached to a synchronous motor by means of a tow line with the tow line passing through a gage which in turn is connected to a microammeter in which the microammeter scale has been replaced with a coefficient of friction scale reading from 0 to 1, with 1 corresponding to a full scale reading of the meter (30 microamps.). The film-covered sled is placed on the level plane and pulled by the motor. The coefficient of friction is read directly from the scale after the sled has traveled 1, 2 and 3 inches and the average of these three values is taken. The test is then repeated with another two small specimens of the film on the sled and the average taken for the three test specimens examined is reported as the coefficient of friction.

These copolymers have outstanding properties for application in uses such as molded articles, extrusions, films and coatings.

The following examples further serve to illustrate this invention.

*Example 1*

Ethylene containing about 183 parts per million of oxygen and 0.24 mole of ethyl acrylate, per hundred moles of ethylene, was compressed to about 30,000 p.s.i. This mixture was forced through a continuous jacketed tubular reactor at a rate of about 2500 pounds per hour at a pressure of about 30,000 p.s.i. and a jacket temperature of about 180° C. After passing through the reactor the liquid copolymer and unreacted monomer were discharged intermittently through a suitable control valve to a heated separating vessel where the copolymer was separated and the unreacted ethylene was recovered for recycling. The molten copolymer was extruded into a water bath and recovered. The ethylene/ethyl acrylate copolymer has a melt index of 0.98 decigram per minute and a density of 0.9212 gram per cc.

*Example 2*

In a manner similar to that described in Example 1 a mixture of ethylene containing 186 parts per million of oxygen and 0.48 mole of ethyl acrylate, per 100 moles of ethylene, was copolymerized to yield a solid ethylene/ethyl acrylate copolymer.

*Example 3*

In a manner similar to that described in Example 1 a mixture of ethylene containing 157 parts per million of oxygen and 0.80 mole of ethyl acrylate, per 100 moles of ethylene, was copolymerized to a solid ethylene/ethyl acrylate copolymer.

*Example 4*

In a manner similar to that described in Example 1 a mixture of ethylene containing 157 parts per million of oxygen and 1 mole of ethyl acrylate, per 100 moles of ethylene, was copolymerized to a solid ethylene/ethyl acrylate copolymer.

*Example 5*

In a manner similar to that described in Example 1 a mixture of ethylene containing 139 parts per million of oxygen and 1.4 moles of ethyl acrylate, per 100 moles of ethylene, was copolymerized to a solid ethylene/ethyl acrylate copolymer.

*Example 6*

In a manner similar to that described in Example 1 a mixture of ethylene containing 155 parts per million of oxygen and 2.1 moles of ethyl acrylate, per 100 moles of ethylene, was copolymerized to a solid ethylene/ethyl acrylate copolymer which showed some tackiness.

*Example 7*

In a manner similar to that described in Example 1 a mixture of ethylene containing 155 parts per million of oxygen and 5 moles of ethyl acrylate, per 100 moles of ethylene, was copolymerized to yield a tacky, dough-like translucent product, which was difficult to evaluate completely.

In addition, polyethylene was produced, following the procedure of Example 1, for comparison purposes. These runs are indicated by the letters A and B in the table. For convenience the results obtained are tabulated below.

4. An ethylene/lower alkyl acrylate solid copolymer obtained by the process claimed in claim 1, said copolymer having a density of from about 0.915 to about 0.94 gram per cc. at 23° C. and said copolymer consisting of units represented by the formulae:

$$[-CH_2CH_2-] \text{ and } \left[\begin{array}{c}-CH_2CH-\\ |\\ COOR\end{array}\right]$$

| Example | 1 | 2 | 3 | 4 | 5 | 6 | 7 | A | B |
|---|---|---|---|---|---|---|---|---|---|
| Ethyl Acrylate in feed, moles/100 moles $C_2H_4$ | 0.24 | 0.48 | 0.80 | 1.0 | 1.4 | 2.1 | 5.0 | 0 | 0 |
| Benzene, moles/100 moles $C_2H_4$ | 0.92 | 0.92 | 0 | 0.96 | 0.89 | 0 | 0 | 0 | 0.99 |
| Catalyst, p.p.m. $O_2$ | 183 | 186 | 157 | 157 | 139 | 155 | 155 | 156 | 202 |
| Conversion | 23.9 | 22.3 | 23.0 | 22.3 | 17.2 | 19.7 | -------- | 20.3 | 22.2 |
| Ethyl Acrylate in resin: | | | | | | | | | |
| mole percent | 1.1 | 1.3 | 2.4 | 3.4 | 4.1 | 8.1 | 15.9 | 0 | 0 |
| wt. percent | 3.8 | 4.4 | 8.1 | 11.3 | 13.2 | 24.1 | 40.3 | 0 | 0 |
| Melt Index, dg./min. | 0.98 | 1.6 | 1.2 | 2.6 | 2.5 | 5.7 | -------- | 1.17 | 1.0 |
| Density, g./cc. at 23° C. | .9212 | .9228 | .9265 | .9296 | .9346 | .9245 | -------- | .9192 | .9190 |
| Stiffness, p.s.i. | 12,000 | 12,000 | 7,000 | 6,000 | 3,000 | 1,000 | -------- | 14,000 | 17,000 |
| Crack Resistance: | | | | | | | | | |
| $F_0$, unaged | 0.10 | 0.4 | >336 | >336 | 2 | 0.08 | -------- | 0.12 | 0.10 |
| $F_{50}$, unaged | 0.16 | 350 | >350 | >350 | 42 | 0.14 | -------- | 0.15 | 0.16 |
| $F_0$, aged 7 days at 70° C. | <0.1 | 0.1 | 1.7 | 3.0 | 0.23 | <0.1 | -------- | <0.1 | <0.1 |
| $F_{50}$, aged 7 days at 70° C. | -------- | 0.14 | 130 | 7.5 | 0.43 | -------- | -------- | -------- | -------- |
| Shrinkage | 12.0 | 25.0 | -------- | 28.0 | 12.8 | -------- | -------- | -------- | 1.0 |
| Impact Strength, ft. | 7 | >7 | -------- | 6 | 6 | -------- | -------- | -------- | 5 |
| Ultimate Elongation, percent | 815 | 830 | 890 | 1,020 | 750 | 522 | -------- | 650 | 770 |
| Ink Adhesion | 1 | 1.25 | -------- | 1.5 | 1.75 | -------- | -------- | -------- | 1 |
| Coefficient of Friction | 0.25 | 0.21 | 0.67 | 1.32 | 1.80 | >2 | -------- | 0.24 | 0.28 |

What is claimed is:

1. A continuous process for producing solid copolymers of ethylene and a lower alkyl acrylate, which comprises continuously feeding and heating a mixture consisting of ethylene and a lower alkyl acrylate in a tubular reactor, said mixture containing from about 0.2 to about 1.5 moles of lower alkyl acrylate per 100 moles of ethylene, at a temperature of from about 100° C. to about 350° C. under a pressure of at least about 20,000 p.s.i. in the presence of from about 0.001 to about 5 mole percent based on the total weight of polymerizable monomers charged of a catalyst selected from the group consisting of oxygen and a peroxidic compound, said alkyl acrylate containing from 1 to about 12 carbon atoms in the alkyl radical.

2. A continuous process for producing solid copolymers of ethylene and a lower alkyl acrylate, which comprises continuously feeding and heating a mixture consisting of ethylene and a lower alkyl acrylate in a tubular reactor, said mixture containing from about 0.4 to about 1 mole of lower alkyl acrylate per 100 moles of ethylene, at a temperature of from about 160° C. to about 250° C. under a pressure of from about 20,000 p.s.i. to about 40,000 p.s.i. in the presence of from about 0.001 to about 5 mole percent based on the total weight of polymerizable monomers charged of a catalyst selected from the group consisting of oxygen and a peroxidic compound, said lower alkyl acrylate containing from 2 to about 6 carbon atoms in the alkyl radical.

3. A process for producing solid ethylene/ethyl acrylate copolymers, which comprises continuously feeding and heating a mixture consisting of ethylene and ethyl acrylate in a tubular reactor, said mixture containing from about 0.4 to about 1 mole of ethyl acrylate per 100 moles of ethylene, at a temperature of from about 160° C. to about 250° C. under a pressure of from about 20,000 p.s.i. to about 40,000 p.s.i. in the presence of from about 0.001 to about 5 mole percent based on the total weight of polymerizable monomers charged of a catalyst selected from the group consisting of oxygen and a peroxidic compound.

wherein the structure of said copolymer is predominantly a series of long chains of [—$CH_2CH_2$—] units with each chain of [—$CH_2CH_2$—] units connected to another chain thereof by a $$\left[\begin{array}{c}-CH_2CH-\\ |\\ COOR\end{array}\right]$$

group containing from 1 to about 5 of said $$\left[\begin{array}{c}-CH_2CH-\\ |\\ COOR\end{array}\right]$$

units, wherein R represents an alkyl group containing from 1 to about 12 carbon atoms.

5. An ethylene/ethyl acrylate solid copolymer obtained by the process of claim 3, said copolymer having a density of from about 0.915 to 0.94 gram per cc. at 23° C. and said copolymer consisting of units represented by the formulae:

$$[-CH_2CH_2-] \text{ and } \left[\begin{array}{c}-CH_2CH-\\ |\\ COOC_2H_5\end{array}\right]$$

wherein the structure of said copolymer is predominantly a series of long chains of [$CH_2CH_2$—] units with each chain of [—$CH_2CH_2$—] units connected to another chain thereof by a $$\left[\begin{array}{c}-CH_2CH-\\ |\\ COOC_2H_5\end{array}\right]$$

group containing from 1 to about 5 of said $$\left[\begin{array}{c}-CH_2CH-\\ |\\ COOC_2H_5\end{array}\right]$$

units.

References Cited in the file of this patent
UNITED STATES PATENTS

| | | |
|---|---|---|
| 2,200,429 | Perrin et al. | May 14, 1940 |
| 2,394,960 | Young | Feb. 12, 1946 |
| 2,414,311 | Larson | Jan. 14, 1947 |